United States Patent
Witte et al.

[15] 3,692,760
[45] Sept. 19, 1972

[54] REGULATION OF MOLECULAR WEIGHT OF PRODUCTS OBTAINED BY THE RING OPENING POLYMERIZATION OF CYCLOOLEFINES

[72] Inventors: Josef Witte, Koeln; Gottfried Pampus, Leverkusen; Nikolaus Schon, Leverkusen; Gunter Marwede, Leverkusen, all of Germany

[73] Assignee: Farbenfabriken Bayer Aktiengesellschaft, Leverkusen, Germany

[22] Filed: Oct. 30, 1970

[21] Appl. No.: 85,782

[30] Foreign Application Priority Data
Nov. 13, 1969 Germany..........P 19 57 026.4

[52] U.S. Cl..............................260/93.1, 252/429 A
[51] Int. Cl...............................C08f 3/02, C08f 7/02
[58] Field of Search......................................260/93.1

[56] References Cited

UNITED STATES PATENTS

| | | | |
|---|---|---|---|
| 3,449,310 | 6/1969 | Dall'Asta | 260/93.1 |
| 3,631,010 | 12/1971 | Witte et al. | 260/82.1 |
| 3,632,849 | 1/1972 | Pampus et al. | 260/93.1 |

*Primary Examiner*—James A. Seidleck
*Assistant Examiner*—Richard A. Gaither
*Attorney*—Connolly & Hutz

[57] ABSTRACT

A process for the production of cycloolefin polymers by the polymerization of cycloolefins in solution in inert organic solvents, using catalysts of tungsten salts and organic aluminum compounds, characterized in that an organic cycloolefin solution having a water content of 5 to 50 ppm, preferably 10 to 20 ppm, is used for the polymerization.

6 Claims, No Drawings

REGULATION OF MOLECULAR WEIGHT OF PRODUCTS OBTAINED BY THE RING OPENING POLYMERIZATION OF CYCLOOLEFINES

Cycloolefines, e.g., cyclobutene, cyclopentene or cyclooctene, can be polymerized using organometallic mixed catalysts of metal salts of groups V*b* and VI*b* of Mendelejeff's Periodic System of Elements and organometallic compounds of groups I*a*, II*a* and III*a* of Mendelejeff's Periodic System, the polymerization being effected by ring opening and producing linear, unsaturated high molecular weight polymers. The double bonds of these polymers may be predominantly in cis or in trans configuration depending on the catalyst used. These polymers can be crosslinked by means of known vulcanization systems, e.g., peroxidic systems or systems containing sulphur and then constitute highly elastic rubbers.

Usually polymers produced in this way have very high molecular weights. In the polymerization of cyclopentene by means of catalysts comprising tungsten salts and organoaluminum compounds, products which have an intrinsic viscosity ($\eta$) in deciliters/grams above 5 (measured in toluene at 25° C) can be obtained. Trans-polypentenamers having viscosities ($\eta$) > 3,0, however, can no longer be processed on conventional apparatus (internal mixers, rollers). It is therefore an object of the invention to adjust the molecular weight and the distribution of molecular weight so that polymers which can be easily processed are obtained.

Molecular weight and distribution of molecular weight influence the processibility of high polymers. The processing properties of a synthetic elastomer can thus be characterized by the relationship between intrinsic viscosity ($\eta$), Mooney viscosity, defo hardness and defo elasticity,(acc. to DIN 53 514) in combination if desired with other parameters. Optimum properties in different types of polymers are indicated and defined by different sets of these data.

It has already been proposed to use $\alpha$-olefins such as butene-1, pentene-1, or open-chain diolefins such as 1-methylbuta-1,3-diene or 2-methylbuta-1,3-diene, etc. as modifier for influencing the molecular weight in the ring opening polymerization of cycloolefins, e.g., of cyclopentene or cyclooctene. At the end of the polymerization a part of these hydrocarbons may be present in the reaction mixture as monomers and then will contaminate the recovered cycloolefin and solvent. Particularly in continuous processes wherein the recovered monomer and solvent are returned to the polymerization zone after drying by azeotropic destillation, it is very difficult to maintain constant modifier concentrations and hence constant polymerization conditions. Moreover the method under consideration is suitable only to reduce molecular weight but not to influence the molecular weight distribution markedly.

This invention relates to a process for the polymerization of cycloolefins dissolved in inert organic solvents with catalysts obtained from tungsten salts and organic aluminum compounds wherein the cycloolefin solution subjected to polymerization has a water content of 5 to 50 ppm, preferably 10 to 20 ppm.

Suitable monomers for the present process are cyclic monoolefins preferably having four, five and seven to 12 carbon atoms in the ring and most preferably cyclopentene. Other examples are cyclobutene, cycloheptene and cyclododecane.

The solvent used may be aliphatic, cycloaliphatic or aromatic hydrocarbons, alkanes as, e.g., hexane, pentane, dodecane, cycloalkanes, as cyclohexane, armotes as benzene, toluene, xylene etc.

Catalysts of tungsten salts, preferably tungsten halides and oxyhalides and especially tungsten chloride and oxychlorides and organometallic compounds of groups I*a*, II*a* and III*a* of the Periodic System are suitable for the process. Most preferred are tungsten salts wherein tungsten is 6 or 5 valent. It is particularly advantageous to use catalysts obtained from:

a. a tungsten salt, e.g., a tungsten halide or oxyhalide as $WCl_6$, $WCl_5$, $WBr_5$, $WCl_4O$, b. a co-catalyst from the group of epoxides of the general formula:

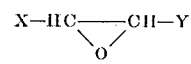

in which
X is a hydrogen atom, an alkyl, aryl or aralkyl group,
Y is a hydrogen atom, an alkyl, aryl, aralkyl, $CH_2Hal$ (Hal = Cl, F, Br or I) or $CH_2OR$ (R = alkyl or aryl) group, and
X and Y may also be substituted, e.g., with alkyl ($CH_3-$) and/or halogen (Cl),
or a halogenated alcohol of the general formula:

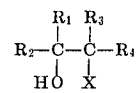

in which
X is F, Cl, Br or I,
$R_1$ and $R_2$, which may be the same or different, represent a hydrogen atom or an alkyl, isoalkyl, aryl or aralkyl radical,
$R_3$ and $R_4$ may be the same or different and represent a chlorine, fluorine, bromine, iodine or hydrogen atom, an alkyl, isoalkyl, aryl or aralkyl group, and
$R_1$ and $R_3$ together with the carbon atoms to which they are attached may form a 5-membered or larger hydrocarbon ring
or a halogenated phenol of the general formula:

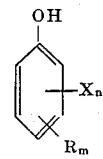

X = F, Cl, Br, I
in which R represents alkyl, aryl, alkylaryl, n is 1 or 2 and m is 0, 1 or 2 and in case of m = 2 also includes one single radical which forms a second cycloaliphatic or aromatic ring.

"Alkyl" and "isoalkyl" as mentioned in the definition above mean preferably alkyl having one to six carbon atoms, "aryl" means preferably phenyl, naphthyl, tolyl, i.e., carbocyclic aromatic radicals having six to 12 carbon atoms, aralkyl is a combination of both preferably benzyl. Examples of such co-catalysts are ethylene oxide, propylene oxide, phenoxy propylene oxide, epichlorohydrin, 2-chloroethanol, 2bromoethanol, 2-fluoroethanol, 2-iodoethanol, 2- chlorocyclohexanol, 2-chlorocyclopentanol and o-, m- and p1chlorophenol; and c) an organic aluminum compound, preferably an aluminum trialkyl, aluminum dialkyl halide, aluminumalkyldihalide, the corresponding aluminum alkoxy compounds or hydrides, alkyl and alkoxy having preferably one to 12, most preferably one to six carbon atoms and halogen being preferably chlorine and bromine, e.g., $Al(C_2H_5)_3$, $Al(iC_4H_9)_3$, $Al(C_2H_5)_2Cl$, $Al(iC_4H_9)_2Cl$, $Al(C_2H_5)Br_2$, $Al(C_2H_5)\text{-}Cl_2$, $Al(C_2H_5)_2OC_2H_5$, $Al_2(C_2H_5)_3Cl_3$, $Al(C_2H_5)_2H$.

The catalyst components are preferably used in a molar ratio of a):b):c) as 1: 0.3 to 10 : 0.5 to 15. In a preferred method of carrying out the process, the tungsten salt a) is first reacted with the co-catalyst b) in a 0.05 to 0.5 molar solution in hydrocarbon solvents, preferably the same solvent in which the polymerization is carried out. By this method, much more highly concentrated solutions of the tungsten compounds can be prepared and only two catalyst components need then be added. The preferred quantity of catalyst used corresponding to about 0.1 to 2 m mol of tungsten per 100 g of monomer, preferably 0, 15 to 0.5 m mol, the amount of other catalyst components being defined by the ratio of the components a:b:c given above.

The polymerization process is generally carried out as follows:

A 5 to 50 percent solution of the monomer in a suitable solvent is prepared. The water content of this solution is adjusted to 5 to 50 ppm by the addition of moist solvent. Tungsten salt and co-catalyst or the reaction product of tungsten salt and co-catalyst are then added, followed by the organic aluminum compound.

Polymerization is carried out at temperatures of −60° C to + 60° C, preferably −15° C to + 15° C. The polymerization time is usually 0.5 to 4 hours, depending on the monomer concentration. Longer polymerization times provide practically no increase in conversion.

After completion of the polymerization, the organometallic mixed catalysts are inactivated, e.g., by adding alcohols, organic acids or amines for example ethanol, methanol, isopropanol, stearicacid, ethylendiamine, N-methyl-ethanolamine. The polymers can be stabilized by the known anti-oxidants, e.g., 2,6-di-tert-butyl-4-methylphenol, 2,2-dihydroxy-3,3′-di-tert-butyl-5,5′-dimethyl-diphenylmethane or phenyl-β-naphtylamine.

The polymers may be precipitated from their solution by the addition of non-solvents, e.g., lower aliphatic alcohols such as methanol, ethanol or isopropanol. For technical processes, isolation of the polymer is preferably carried out by introducing the inactivated and stabilized polymer solution into hot water. Water and solvent then distil off as an azeotropic mixture (steam distillation, stripping). The polymer is obtained in the form of crumbs. The rubber crumbs which still contain water can be dried, e.g., in a vacuum drying chamber, on a conveyor belt drier or in drying screw.

The process described here has many advantages over the prior art. Water which serves as modifier is continuously removed by azeotropic distillation in the course of processing and returning the solvent and unreacted monomer. The water content in the polymerization zone can easily be adjusted to a predetermined value, for example by adding measured quantities of moist solvent. In the process of the invention a reduction of average molecular weight and an increased range of the molecular weight distribution as shown by a distinctly increased defo elasticity at unchanged defo hardness (DIN 53 514) can be achieved, either simultaneously (Example 2) or separately (Example 4), depending on the choice of catalyst components and the molar ratio of aluminum to tungsten used in the mixed catalyst.

In the case of certain catalyst combinations, the addition of water according to the invention has a co-catalytic effect, substantially higher yields being obtained under otherwise the same reaction conditions (Examples 1 and 3).

EXAMPLE 1

800 g of toluene and 200 g of cyclopentene are introduced into a flask equipped with stirrer with exclusion of oxygen and moisture. 4 ml of a 0.2 molar solution of a reaction product of tungsten hexachloride and 2-chloroethanol in the molar ratio of 1:1 in toluene are then added. In this experiment, 15 mg of water are then added with vigorous stirring and under nitrogen, using a microliter syringe, and the reaction mixture is cooled to −10° C. 1.75 ml of a 1-molar solution of aluminum diethyl monochloride in toluene are then added. The polymerization temperature is allowed to rise to +10° C in the course of 4 hours. Polymerization is then stopped by the addition of a solution of 1 g of 3,3′-di-tert-butyl-2,2′-dihydroxy5,5′-dimethyl-diphenylmethane, 0.5 g of ethylene diamine and 2.0 g of ethanol in 50 ml of toluene. The polymer is isolated by precipitation with ethanol and dried at 50° C in vacuo. The conversion after 4 hours is 80 to 90 percent. The influence of the amount of water added on the properties of the crude rubber is summarized in the table below in which different amounts of water are used.

1. The reaction product of tungsten hexachloride and 2-chloroethanol was made as follows:

9,9 g of $WCl_6$ (25 m mol) and 100 ml of dry toluene are placed in a flask excluding oxygen and moisture. 2,01 g of 2-chloroethanol (25 m mol) dissolved in 23 ml of dry toluene are introduced with stirring within 60 min. Resulting hydrogen chloride is completely removed by passing a slight current of nitrogen through the solution. Stirring is continued for 3 to 4 hours. The solution thus obtained is 0,2 molar based on tungsten.

Reaction products of other molar ratios of tungsten hexachloride and 2-chloroethanol are made accordingly with other amounts of the starting materials.

TABLE 1

| | | | |
|---|---|---|---|
| Toluene | 800 g | 800 g | 800 g |
| Cyclopenene | 200 g | 200 g | 200 g |
| Water | — | 5 mg | 10 mg |
| $WCl_5\text{-}OCH_2CH_2Cl$ 0.2 molar in toluene | 4 ml | 4 ml | 4 ml |
| Temperature $Al(C_2H_5)_2Cl$ 1.0 molar in toluene | 1.75 ml | 1.75 ml | 1.75 ml |
| Conversion after 4 hours (%) | 58 | 75 | 73 |
| ML-4′/100°C | 132 | 75 | 70 |
| Defo, 80°C | 1125/14 | 675/19 | 525/15 |

The Mooney viscosity and defo value (plasticity) according to Baader (DIN 53 523) show a distinct reduction in molecular weight.

EXAMPLE 2

Polymerization mixtures were prepared as described in Example 1, using a reaction product of $WCl_6$ and 2-chloroethanol in the molar ratio of 1:1.25.

TABLE 2

| Toluene | 1130 g | 1130 g | 1130 g |
|---|---|---|---|
| Cyclopentene | 200 g | 200 g | 200 g |
| $H_2O$ | — | 10 mg | 15 mg |
| $WCl_{4.75}$-$(OCH_2CH_2Cl)_{1.25}$ 0.2 m in toluene −10°C. | 5 ml | 5 ml | 5 ml |
| $Al(C_2H_5)_2Cl$ 1.0 m in toluene | 2.6 ml | 2.6 ml | 2.6 ml |
| Conversion after 3 hours (%) | 77 | 80 | 77 |
| ($\eta$) toluene/25°C (dl/g) | 3.0 | 2.4 | 2.2 |
| ML-4'/100°C | 124 | 79 | 70 |
| Defo H/E (80° C) | 1200/17 | 950/17 | 900/27 |

The ratio of the viscosity data indicates not only a distinct reduction in molecular weight but also an increase in range of molecular weight distribution.

EXAMPLE 3

A cyclopentene containing 300 ppm of α-olefines was polymerized in toluene as solvent as described in Example 1 and worked up. The tungsten component of the catalyst used was the reaction product of 1 mol of $WCl_6$ and 1.0 mol of chloroethanol. The quantity of water shown in Table 3 was added in each case before addition of the tungsten compound.

TABLE 3

| Toluene (g) | 800 | 800 | 800 |
|---|---|---|---|
| Cyclopentene (g) | 200 | 200 | 200 |
| $H_2O$ (mg) | 0 | 5 | 10 |
| $WCl_5$-$(OCH_2$-$CH_2Cl)$ (mMol) 0.05 m in toluene (ml) | 16 | 16 | 16 |
| $ClAl(C_2H_5)_2$ (mMol) 1.0 m in toluene (ml) | 1.76 | 1.76 | 1.76 |
| Conversion after 4 hours at 0°C in % | 61 | 76 | 76 |
| ($\eta$) at 25°C in toluene (dl/g) | 2.96 | 1.8 | 2.0 |
| ML-4'/100°C | 130 | 41 | 53 |
| Defo, 80°C | 1400/14 | 300/16 | 375/18 |

EXAMPLE 4

Cyclopentene was polymerized in a 15 percent solution in toluene as solvent. The tungsten component of the catalyst used was the reaction product of 1 mol of $WCl_6$ and 2.0 mols of epichlorohydrin. Quantities and experimental conditions are shown in Table 4.

TABLE 4

| Toluene (g) | 1130 | 1130 |
|---|---|---|
| Cyclopentene (g) | 200 | 200 |
| $H_2O$ (mg) | 0 | 15 |
| $WCl_4(OCH(CH_2Cl)_2)_2$ 0.2 m in toluene (ml) | 4 | 4 |
| Temperature (°C) | | |
| $Al(C_2H_5)_2Cl$ 1.0 m in toluene (ml) | 2.4 | 2.8 |
| Polymerisation time (h) | 3 | 3 |
| Conversion after 4 hours (%) | 75 | 73 |
| ($\eta$) toluene/25°C (dl/g) | 1.9 | 1.8 |
| Defo H/E at 80°C | 180/5 | 320/16 |
| ML-4'/100°C | 43 | 41 |

We claim:

1. A process which comprises contacting at least one cyclic monoolefin having four, five or from seven to 12 carbon atoms in the ring at a temperature of from −60° to 60° C. in an inert organic solvent having a water content of from 5 to 50 parts per million with a catalyst consisting of
   a. tungsten halide or tungsten oxyhalide,
   b. an epoxide of the formula

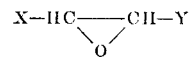

in which X is hydrogen, alkyl having from one to six carbon atoms, phenyl, naphthyl, tolyl or benzyl and Y is hydrogen, alkyl having from one to six carbon atoms, phenyl, naphthyl, tolyl, benzyl, halomethyl, alkoxymethyl having 2 to 7 carbon atoms, phenoxymethyl, naphthoxymethyl or tolyloxymethyl or a halogenated alcohol of the formula

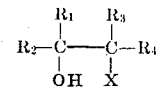

wherein X is halogen, $R_1$ and $R_2$ are hydrogen, alkyl having from one to six carbon atoms, phenyl, naphthyl, tolyl or benzyl, $R_3$ and $R_4$ are hydrogen, halogen, alkyl having from one to six carbon atoms, phenyl, naphthyl, tolyl or benzyl and $R_1$ and $R_3$, taken together with the carbon atoms to which they are attached, may form a hydrocarbon ring containing at least five carbon atoms or a halogenated phenol of the formula

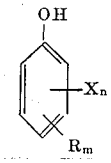

wherein X is halogen and R is alkyl having one to six carbon atoms, phenyl, naphthyl, tolyl or benzyl, $n$ is 1 or 2 and $m$ is 0, 1 or 2 and
   c. an organic aluminum compound selected from the group consisting of aluminum trialkyl, dialkyl aluminum halide, alkyl aluminum dihalide, alkoxy aluminum dialkyl, dialkoxy aluminum alkyl, alkoxy aluminum dihalide and dialkoxy aluminum halide, the molar ratio of (a):(b):(c) being 1:0.3 to 10:0.5 to 15 and the amount of tungsten in said catalyst being from 0.1 to 2 m mol per 100 g of contacted cyclic monoolefin.

2. The process of claim 1 wherein the amount of tungsten in said catalyst is from 0.15 to 0.5 m mol per 100 g of contacted cyclic monoolefin.

3. The process of claim 1 wherein said water content is from 10 to 20 ppm.

4. The process of claim 1 wherein said tungsten halide or tungsten oxyhalide is $WCl_6$, $WCl_5$, $WBr_5$ or $WOCl_4$.

5. The process of claim 1 wherein said organic aluminum compound is $Al(C_2H_5)_3$, $Al(isoC_4H_9)_3$, $Al(C_2H_5)_2Cl$, $Al(isoC_4H_9)_2Cl$, $Al(C_2H_5)Br_2$, $Al(C_2H_5)Cl_2$, or $Al(C_2H_5)_2OC_2H_5$.

6. The process of claim 1 wherein said temperature is −15° to 15° C.

* * * * *